United States Patent [19]

Koide

[11] Patent Number: 5,422,988
[45] Date of Patent: Jun. 6, 1995

[54] METHOD AND APPARATUS FOR RENDERING A THREE-DIMENSIONAL OBJECT WITH A PLURALITY OF DOTS

[75] Inventor: Akio Koide, Kawasaki, Japan

[73] Assignee: International Business Machines Corporation, Armonk, N.Y.

[21] Appl. No.: 904,356

[22] Filed: Jun. 25, 1992

[51] Int. Cl.$^6$ .............................................. G06F 15/00
[52] U.S. Cl. ..................................... 395/129; 395/130; 395/125
[58] Field of Search ............... 395/125, 123, 121, 120, 395/119, 126, 127, 128, 129; 340/727

[56] References Cited

U.S. PATENT DOCUMENTS 4,860,217 8/1989 Sasaki et al. ..................... 395/125
4,899,293 2/1990 Dawson et al. .................. 395/123

OTHER PUBLICATIONS

"Van der Waals Surfaces in Molecular Modeling, Implementation with Real Time Computer Graphics," by P. A. Bash et al., Science, vol. 222, pp. 1325–1327, 1983.
"Guide to Molecular Simulation" by A. Koide, edited by Okada and Osawa, published by Kaibundo, pp. 207–210, 1989.
1986 Brochure on "Anchor" a three dimensional molecular design support package of Fujitsu.
"IBM Announcement Letter to CU/6000 Software Program", Mar. 18, 1991.

Primary Examiner—Heather R. Herndon
Assistant Examiner—Mike Smith
Attorney, Agent, or Firm—Paul S. Drake

[57] ABSTRACT

To render a three-dimensional object by using a plurality of dots, surfaces forming the three-dimensional object are divided into several regions based on curvature of the surfaces forming the object. A plurality of dots are arranged on the surfaces forming the object in accordance with rules which are different with respect to the different regions. To render a sphere by using a plurality of dots, spherical surfaces of the sphere are divided into polar regions and the equatorial region. In polar regions, dots whose number increase in accordance with radius around the axis of revolution are distributed at an equal interval on coaxial circumferences on polar regions. In the equatorial region, a certain number of dots are distributed at an equal interval on coaxial circumferences on the equatorial region so that a dot on the circumference are placed between dots on adjacent circumferences in the equatorial region.

18 Claims, 14 Drawing Sheets

```
/* ©Copyright International Business Machines Corporation 1991 All Rights Reserved    */
/*--------------------------------------------------------------------------------*/
/* PROGRAM NAME : int dotgen (float, int, int, int, float *)                       */
/*--------------------------------------------------------------------------------*/
/* Function : Generate dots on spherical surface.                                  */
/*--------------------------------------------------------------------------------*/
/*   M (center) = 2 * Mhalf - 1                                                    */
/*   number of points to be generated                                              */
/*       = 6 * N * ( N + M ) + 2                                                   */
/*       = 6 * N * ( N + 2 * Mhalf - 1 ) + 2                                       */
/*--------------------------------------------------------------------------------*/
/*   pole part        for ( n = 0 ; n <= N ; n++ )                                 */
/*                                                                                 */
/*   center part      for ( n = 1 ; n <  M ; n++ )                                 */
/*                                                                                 */
/*--------------------------------------------------------------------------------*/
/* Written by Akio Koide,    13 Mar 1991                                           */
/* Modified by Akio Koide,   18 May 1992                                           */
/*--------------------------------------------------------------------------------*/

/* - - - declare include header files - - - - - - - - - - - - - - - - - - - - - -*/
#include   <math.h>

/* - - - define synonym - - - - - - - - - - - - - - - - - - - - - - - - - - - - -*/
/* constants */
#define   pi_divided_by_3      1.047197551196598

/*--------------------------------------------------------------------------------*/

/* - - - argument list - - - - - - - - - - - - - - - - - - - - - - - - - - - - - */
/* <input>                                                                         */
/*      float     R              ;    radius of sphere                             */
/*      int       N              ;    number of dots around polar part             */
/*      int       Mhalf          ;    half number of dots in central part          */
/*      int       point_max      ;    maximum array size of vrtx                   */
/* <ouput>                                                                         */
```

FIG. 14A

```
/*     int      dotgen ()       ;     a number of generated dosts    */
/*     float    *dots           ;     array storing generated dots   */
/*------------------------------------------------------------------*/ int dotgen (float R, int N, int Mhalf, int point_max, float (*dots) [3]) {

/*- - - define local variables - - - - - - - - - - - - - - - - - - - */
    int      points = 0 ;      /* default return value */
    int      M;                /* number of dots in central part */
    int      n, m ;            /* Local counter    */
    float    temp, cs, sn, cs2, sn2, x, y, z, dz, ddz ;
    double   angle ;

/*- - - procedure start - - - - - - - - - - - - - - - - - - - - - - */

/* Set number of points in central region */
    M = 2*Mhalf - 1;
    if ( M < 1 || N < 1 )  return(0);
    /*-------------------------*/
    /* poles  (0, 0, 1) and ( 0, 0, -1)   */
    /*-------------------------*/
        dots [ 0 ][ 0 ] = 0.0 ;
        dots [ 0 ][ 1 ] = 0.0 ;
        dots [ 0 ][ 2 ] =  R ;

points = 1;
    /*-------------------------*/
    /*   polar region          */
    /*-------------------------*/ z   =  R;
    dz  =  R / ( (float) ( N * (N+M) ) ) ;
    ddz =  dz+dz;

/* loop over longitude direction   */
    for ( n = 1 ; n <= N ; n++ ) {
        /* compute z-component of coordinates defined by
        z = R * ( 1 - ( (float) (n*n) ) / ( (float) ( N * (N+M) ) ) ;
```

FIG. 14B

```
B                                                                                              B
        */
        z -= dz; dz += ddz;
        /* compute rotational angle between two dots */
        angle = pi_divided_by_3 / ( (double) n ) ;
        cs = cos( angle ) ;
        sn = sin( angle ) ;
        /* compute radius of latitude circle */
        x = sqrt( R * R - z * z ) ;
        y = 0.0 ;

*/ loop over half of latitude circle */
        for ( m=0 ; m<3*n && points<point_max ; m++, points++ ) {
                    dots[points] [0] = x ;
                    dots[points] [1] = y ;
                    dots[points] [2] = z ;
                    temp = cs * x - sn * y ;
                    y    = sn * x + cs * y ;   x   = temp ;
        }
    }

/*------------------*/
    /*   central region           */
    /*------------------*/

/* previous cs, sn, z, angle will be used here */
    dz = 2.0 * R / ( (float) ( N+M ) ) ;
    angle = 0.5 * angle ; /* set shift angle */
    cs2 = cos ( angle ) ;
    sn2 = sin ( angle ) ;

/* loop over half of longitude direction */
    for ( n = 1 ; n < Mhalf; n++ ) {
             /* compute z-component of coordinates defined by
             z = R * ( (float) ( M-2*n ) ) / ( (float) ( N * (N+M) ) );
             */
C                                                                                              C
```

FIG. 14C

C ─────────────────────────────────────────────────────────── C
```
            z -= dz ;
            /* compute radius of latitude circle */
            x = sqrt ( R*R - z*z );
            if ( n % 2 ) {    /* half shift */
                        y = sn2 * x ;   x = cs2 * x ;
            } else      y = 0 ;

/* loop over half of latitude circle */
            for ( m=0 ; m<3*N && points<point_max ; m++, points++ ) {
                        dots[points] [0] = x ;
                        dots[points] [1] = y ;
                        dots[points] [2] = z ;
                        temp = cs * x - sn * y ;
                        y    = sn * x + cs * y ;   x = temp ;
            }
}

/*------------------------------*/
/* Copy with C2 Rotation ( x=-x, y=-y) except pole  */
/*------------------------------*/
   n = 2*points-1;  /* Set an number of points to be generated */
   for (m=1; points<n && points<point_max; m++, points++) {
        dots[points] [0] = -dots[m] [0] ;
        dots[points] [1] = -dots[m] [1] ;
        dots[points] [2] =  dots[m] [2] ;
   }

/*------------------------------*/
/* Copy with inversion            */
/*------------------------------*/
   n = 2*points;    /* Set an number of points to be generated */
   for (m=0; points<n && points<point_max; m++, points++) {
        dots[points] [0] = -dots[m] [0] ;
        dots[points] [1] = -dots[m] [1] ;
        dots[points] [2] = -dots[m] [2] ;
   }
/*-- exit --------- See you again ------------------*/
   return ( points );
}
```

FIG. 14D

METHOD AND APPARATUS FOR RENDERING A THREE-DIMENSIONAL OBJECT WITH A PLURALITY OF DOTS

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

TECHNICAL FIELD

The present invention relates to a method and an apparatus for rendering a three-dimensional object and more particularly to a method and an apparatus for rendering a three-dimensional object, including a body of revolution such as a sphere, with a plurality of dots on a two-dimensional surface, such as a cathode-ray-tube display (CRT), in a computer graphics system.

BACKGROUND ART

It has recently become popular to render various kinds of three-dimensional objects on a two-dimensional display screen with a computer graphics system in research or engineering applications. One of these applications is molecular modeling or molecular simulation which is used to research characteristics of substances by displaying a three-dimensional molecular model on a display such as a CRT, a printer, or a plotter. In molecular modeling, spherical and curved surfaces are three-dimensionally depicted by using a plurality of dots on a two-dimensional display screen.

The method of rendering a three-dimensional object by using a plurality of dots is simple compared with the so-called solid model method or space filling representation in which spherical and curved surfaces are completely smeared or painted while maintaining the three-dimensional feeling. Therefore, an advantage exists in that rendering can be executed at a high speed without requiring a great deal of computer throughput. The present invention relates to a method of and an apparatus for rendering three-dimensional objects, including a body of revolution, such as a sphere, by using a plurality of dots.

Throughout this specification, a dot may also be referred to as a point, a marker or any other shapes. They have a limited size and are adequately small when compared with the entire size of a rendered three-dimensional object. Shape of a dot, marker, or point may include lines, circles, crosses, or any other shape. They may be displayed as luminescent points, black points, or in any other color on the display screen.

The importance of depicting the spherical surfaces of a molecular model by using a plurality of dots is described by Bash, P. A. et al. in "Van der Waals Surfaces in Molecular Modeling, Implementation with Real Time Computer Graphics," *Science*, Vol. 222, pp. 1325–1327, 1983.

The conventional method of three-dimensionally depicting spherical surfaces by using a plurality of dots includes the flat-to-spherical-surface equal-area mapping method (for details, see "Guide to Molecular Simulation" written by A. Koide, edited by Okada and Osawa, and published by Kaibundo, pp. 209–210, 1989). This prior art method is shown in FIG. 10. Lattice 100 of equilateral triangles on a horizontal plane is projected in parallel with a projection direction A onto a sphere 101. In this method, the sphere 101 is represented by dots placed on the surface of the sphere 101 corresponding to the lattice points 100 or the apexes of equilateral triangles on the plane. The drawback of this prior art method is that, although the view of the sphere 101 from the projection direction A is good, the view of the sphere 101 from the direction B which is perpendicular to the projection direction A is not good because dots are concentrated on a circumference area 103 of the sphere 101 in view from the projection direction A. And when the sphere 101 is rotated, the circumference area 103 seems to be a ring or a stripe on the sphere 101 because dots are more concentrated on the circumference area 103 than any other surface areas in the sphere 101.

Another prior art method of rendering a sphere by using a plurality dots is the latitude-longitude intersection method used in "Molecular Design Support System," program Nos. 5788-JKF/JKG/JKH/JKJ/JKL/JKN, which is developed by IBM-Japan and which is one of the graphics and program products of IBM-Japan. This prior art method is shown in FIG. 11. In this prior art method, a sphere 111 is rendered by using a plurality of dots which are placed at intersections 112 between latitudes 113 and longitudes 114 on the surface of the sphere 111. The drawback of this prior art method is that dots are concentrated on polar areas 115, 116 of the sphere 111. On the other hand, the dots are scarce at the equatorial area of the sphere 111.

The other method of rendering a sphere by using a plurality dots is called the point symmetry group method. This method uses symmetry technique as shown in FIG. 12. If one dot 121 at Cartesian coordinates (x,y,z) on a sphere 120 is determined, 47 other dots on the sphere 120 are determined at the following Cartesian coordinates:

$$(x,y,z)(-x,y,z)(-x,z,y)(x,-y,z)(x,-z,y)(x,y,-z)(x,z,-y)$$
$$(y,x,z)(y,z,x)(-y,x,z)(-y,z,x)(y,-x,z)(y,-z,x)(y,x,-z)$$
$$(y,z,-x)(z,x,y)(z,y,x)(-z,x,y)(-z,y,x)(z,-x,y)(z,-y,x)$$
$$(z,x,-y)(z,y,-x)(-x,-y,z)(-x,-z,y)(x,-y,-z)(x,-z,-y)$$
$$(-x,y,-z)(-x,z,-y)(-x,-y,-z)(-x,-z,-y)(-y,-x,z)$$
$$(-y,-z,x)(y,-x,-z)(y,-z,-x)(-y,x,-z)(-y,z,-x)$$
$$(-y,-x,-z)(-y,-z,-x)(-z,-x,y)(-z,-y,x)(z,-x,-y)$$
$$(z,-y,-x)(-z,x,-y)(-z,y,-x)(-z,-x,-y)(-z,-y,-x)$$

FIG. 13 shows the dot representation of a sphere by using this prior art method. This method is used in ANCHOR, a three dimensional molecular design support package, of Fujitsu, in which a dot model for a molecular is displayed by a plurality of dots by using this prior art method. The drawback of this prior art method is that there is no pole or orientation of the sphere as shown in FIG. 13 rendered by using this method. Therefore, it is difficult to tell the orientation of a sphere depicted by using this prior art method after rotation or revolution of the sphere.

In the prior art equal-area mapping method as shown in FIG. 10, a view of a three-dimensional model from an angle different from the projection direction while continuously, that is, in real time, rotating the model is not preferable. This is because the region of outer periphery of the spherical surface in view from the projection direction where dots are concentrated appears as a stripe or a ring similar to the equator. In the prior art latitude-longitude intersection method as shown in FIG. 11, it is occasionally difficult to observe the model because dots tend to concentrate at the north and south polar regions and disperse around the equatorial region. In the prior art point symmetry group method as shown in FIG. 13, more dots are generally required for rendering and more computer throughput is required for the calculation of coordinate conversion of dots to rotate the molecular model. In addition, the dots after revolution or rotation of the sphere are unnaturally arranged. Thus, it is difficult to tell the orientation of a sphere after rotation or revolution of the sphere rendered by using this prior art method.

DISCLOSURE OF THE INVENTION

It is an object of the present invention to provide a method of and an apparatus for rendering a three-dimensional object on a two-dimensional display screen by using a plurality of dots in a computer graphics system so that calculations are simplified, dots are uniformly distributed on surfaces forming the object and not unnaturally arranged on the surfaces, the direction of the three-dimensional object can easily be obtained even after it is rotated, and the distribution of dots on the surfaces is not unnatural even after the rotation of the object.

According to the present invention, surfaces of a three-dimensional object are divided into plural kinds of regions or domains and dots are arranged on the surfaces in accordance with different methodologies with respect to each region in order to render the three-dimensional object on a two-dimensional display screen by using a plurality of dots in a computer graphics system.

To depict a body of revolution by using a plurality dots in an embodiment of the present invention, surfaces forming the body are divided into a first region, e.g., north and south polar regions for a sphere where the axis of revolution intersects the surface of the body, which has a relatively large change in radius of revolution of the body and a second region, e.g., equatorial region for a sphere, which has a relatively small change in radius of revolution of the body.

Dots are arranged on the surfaces in accordance with different rules in the first and second regions. That is, in the first region, dots whose number increases in accordance with the increase of the radius of revolution of the body are arranged at an equal interval on equally-spaced coaxial circumferences on the surfaces of the first region. In the second region, a certain number of dots are arranged at an equal interval on equally-spaced coaxial circumferences on the surfaces of the second region so as to position a dot on a coaxial circumference between the dots on the adjacent coaxial circumferences in the second region.

In the above-mentioned sphere, dots whose number increases, e.g., in an arithmetic progression, in the direction from the poles to the equator are arranged at equal intervals on coaxial circumferences on the surface in polar regions and a certain number of dots are arranged at equal intervals on coaxial circumferences on the sphere in the equatorial region so as to position a dot on a circumference between the dots on the adjacent circumferences in the equatorial region. In the above arithmetic progression in the polar regions, a first term may be "1" (one point at each pole) and a common difference may be "5" or "6".

BRIEF DESCRIPTION OF THE DRAWING

The invention will be better understood from the following detailed description of a preferred embodiment of the invention with reference to the drawings in which:

FIGS. 14a–d shows a program list written in C language to generate dots so as to depict a sphere by a plurality of dots according to the preferred embodiment of the present invention.

BEST MODE FOR CARRYING OUT THE INVENTION

Figure 1:
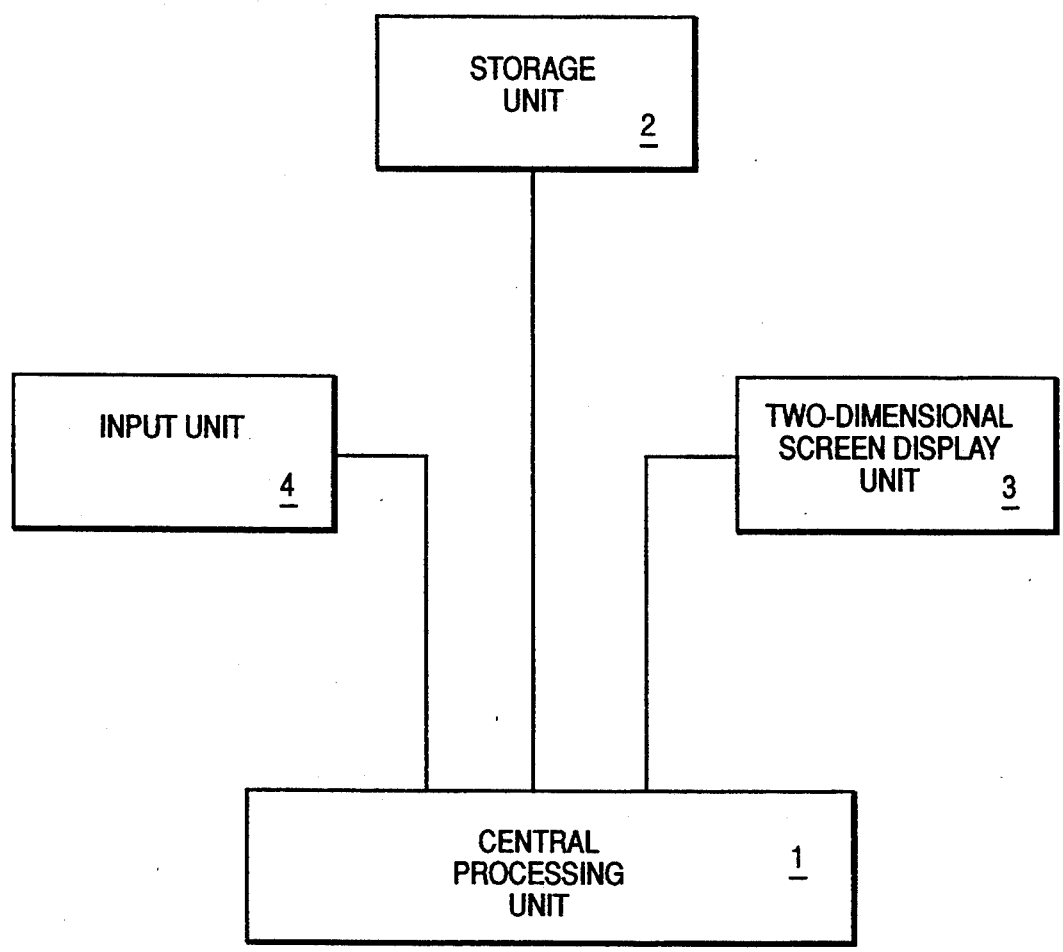
FIG. 1 shows a block diagram of a computer graphics system used for implementing a method according to a preferred embodiment of the present invention.

FIG. 1 shows the essential components of a computer graphics system for implementation of a method according to a preferred embodiment of the present invention. The system may be an IBM RISC System/6000 (trademark of International Business Machines Corporation) or other computer graphics system. In FIG. 1, reference numeral 1 is a central processing unit used to execute arithmetic operations and control instructions. Reference numeral 2 is a storage unit used to store the computer program and data to execute the method of the preferred embodiment of the present invention. Reference numeral 3 is two-dimensional screen display unit, such as a CRT display, capable of displaying all display graphic points. Reference numeral 4 is an input unit, such as a keyboard or mouse, available for the operator to input data and command to the system. The embodiment of the invention may be implemented in molecular-modeling and other graphics-application programs stored in the storage unit 2. When the central processing unit 1 executes the program, a three-dimensional object is displayed on the two-dimensional display screen 3 by using a plurality of dots.

Figure 2:
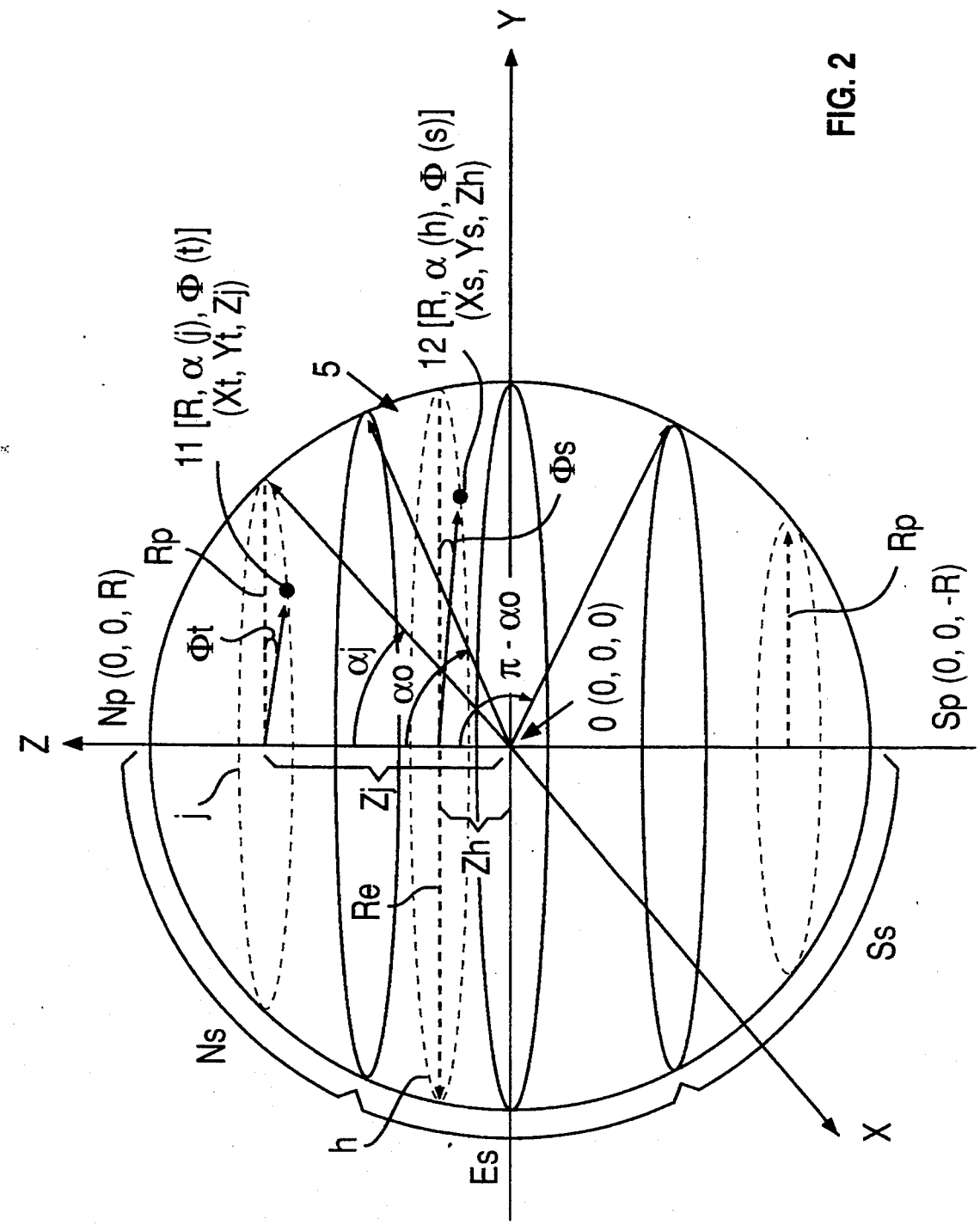
FIG. 2 shows how to divide spherical surfaces of a sphere and how to arrange dots on each divided spherical surface in accordance with rules according to a preferred embodiment of the present invention.

This embodiment of the invention is described hereinafter in the explanation of how to render a three-dimensional object, e.g., a sphere 5 with radius R as shown in FIG. 2, by using a plurality of dots. The Cartesian coordinates of the center O of the sphere 5 are (O,O,O), those of the north pole Np are (O,O,R), and those of the south pole Sp are (O,O,−R). The spherical surfaces forming the sphere 5 are divided into three regions, north and south polar regions Ns, Ss, and the equatorial region Es, at angles $\alpha o$ and $\pi - \alpha o$ between radii around the center O and Z-axis which is the axis of revolution of the sphere 5. In the north polar region Ns and south polar region Ss, the change of radius Rp of revolution around Z-axis is larger than the change of radius Re of revolution around Z-axis in the equatorial region Es. In this embodiment of the invention, in order to depict the sphere 5 by using a plurality of dots, dots are distributed on the north and south polar regions Ns and Ss in accordance with the same rule. However, dots are distributed on the equatorial region Es in accordance with a rule different from the rule for the north and south polar regions Ns, Ss.

In Step 1, how to arrange dots on the north polar region Ns for depicting the north polar region Ns according to the embodiment is described below. Firstly, one dot is placed on the north-pole Np (O,O,R). Then 6j dots, where j is an integer from 1 to N, are arranged at equal intervals on N coaxial circumferences j on the spherical surfaces of north polar region Ns of the sphere 10. The coaxial circumferences j are in parallel with latitude of the sphere 5, have a common axis, that is, Z-axis, have radii Rp around Z-axis, and have height of Zj from the equatorial surface, that is, X-Y plane.

In equatorial region Es, 6N dots are arranged at equal intervals on M coaxial circumferences h, where h is an integer from 1 to M, which are in parallel with latitude of the sphere 5, which have a common axis, that is, Z-axis, and which have radii Re around Z-axis, and which have height Zh from the equatorial surface, that is, X-Y plane. In this case, Zj is represented as follows:

$$Zj = R(1 - j^2/N(N+M)) \quad (A)$$

The equation (A) can be obtained as follows: A dot 11 on the north polar region Ns has polar coordinates $[R, \alpha(j), \Phi(t)]$ where $\alpha$ is the angle between the radius at the dot 11 around the center O and Z-axis, $\Phi$ is the angle between the radius Rp at the dot 11 around Z-axis and Y-axis, and t is an integer from 0 to $6j-1$. Since 6j dots are arranged at an equal interval on a coaxial circumference j, $\Phi$ can be represented as follows:

$$\Phi = (\pi/3j)t \quad (1)$$

A dot 12 on the equatorial region Es has polar coordinates $[R, \alpha(h), \Phi(s)]$ where $\alpha$ is the angle between the radius at the dot 12 around the center O and Z-axis, $\Phi$ is the angle between the radius Re at the dot 12 around Z-axis and Y-axis, and s is an integer from 0 to $6N-1$. Since 6N dots are arranged at an equal interval on a coaxial circumference h, $\Phi$ can be represented as follows:

$$\Phi = (\pi/3N)s \quad (2)$$

In order to uniformly distribute dots on any surfaces Ns, Es of the sphere 10, the density n of dots must be equal at any surfaces of the sphere 10. The density n of dots can be represented by the following equations at each surface. The density n of dots at the north polar region Ns is:

$$n = djdt/\sin \alpha d\alpha d\Phi \quad (3)$$

where d means differential of value, djdt means the number of dots, and $\sin \alpha\, d\alpha d\Phi$ means an surface area on the sphere 5. From the equation (1), $d\Phi/dt = (\pi/3j)$. Then, the density equation (3) at the north polar region Ns can be represented as follows:

$$n = (3j/\pi)dj/\sin \alpha d\alpha \quad (4)$$

The density n of dots at the equatorial region Es is:

$$n = dhds/\sin \alpha d\alpha d\Phi \quad (5)$$

From the equation (2), $d\Phi/ds = (\pi/3N)$. Then, the density equation (5) at the equatorial region Es can be represented as follows:

$$n = (3N/\pi)dh/\sin \alpha d\alpha \quad (6)$$

Since the density n is constant, the equation (4) at the north polar region Ns can be changed by integral as follows:

$$-n \cos \alpha + C = (3/2\pi)j^2$$

Where $\alpha$ is zero, j is also zero. Then, constant C is n in the above equation. Then, $$\cos \alpha = 1 - (3/2n\pi)j^2 \quad (7)$$

Since the density n is constant, the equation (6) at the equatorial region Es can be changed by integral as follows:

$$-n \cos \alpha + C = (3N/\pi)h$$

Where $\alpha$ is $\alpha o$, h is zero. Then, constant C in the above equation is $n \cos \alpha o$. Then, $$\cos \alpha = \cos \alpha o - (3 N/n\pi)h \quad (8)$$

As for the equation (7), where j is N, $\alpha$ is $\alpha o$. Then, $$\cos \alpha o = 1 - (3/2n\pi)N^2 \quad (9)$$

As for the equation (8), where h=M, $\alpha = \pi - \alpha o$. Then, $$-\cos \alpha o = \cos \alpha o - (3N/n\pi)M \quad (10)$$

From the equations (9) and (10), the density n is represented as follows:

$$n = (3/2\pi)N(N+M) \quad (11)$$

Then, the equation (7) which represents $\cos \alpha$ at the north polar region Ns can be represented as follows:

$$\cos \alpha = 1 - j^2/N(N+M) \quad (12)$$

The equation (8) which represents cos α at the equatorial surface Es can be represented as follows:

$$\cos \alpha = \cos \alpha_0 - 2h/(N+M) \quad (13)$$

As for the equation (13), where h is M, α is $\pi - \alpha$. Then, cos $\alpha_0$ is $M/(N+M)$. Then, the equation (13) is represented as follows:

$$\cos \alpha = (M-2h)/(N+M) \quad (14)$$

When the equation (12) is multiplied by R, then Zj which is the height of the coaxial circumference j on which the dot 11 is placed in the north polar region Ns is obtained as follows:

$$Zj = R[1 - j^2/N(N+M)] \quad (A)$$

The method of arranging dots on the north polar region Ns of the sphere 5 for depicting the surface of the region is to place a dot at Cartesian coordinates (Xt,Yt,Zj) where j is an integer form 1 to N and t is an integer from 0 to 6j−1. Xt and Yt are obtained to distribute 6j dots at an equal interval on a coaxial circumference j as follows:

$$Xt = sqrt(R^2 - Zj^2) \cos(2t\pi/6j) \quad (15)$$

$$Yt = sqrt(R^2 - Zj^2) \sin(2t\pi/6j) \quad (16)$$

Then, in order to depict the spherical surfaces of the north polar region Ns, each dot is placed at Cartesian coordinates (Xt,Yt,Zj) where j is an integer from 1 to N, t is an integer from 0 to 6j−1, and Xt, Yt, Zj are represented by the equations (15), (16), and (A), respectively.

In Step 2, in order to render the spherical surfaces of the south polar region Ss, dots are placed at the position of coordinates (Xt,Yt,−Zj) which corresponds to the coordinates (Xt,Yt,Zj) of the dots on the north polar region Ns which are obtained in Step 1 except that Zj is changed to −Zj. The method of arranging dots on the south polar region Ss is substantially the same as the method used of arranging dots on the north polar region Ns in Step 1.

In Step 3, dots are arranged for rendering the equatorial surface Es. In the equatorial region Es, 6N dots are arranged at an equal interval on M coaxial circumferences h, where h is an integer from 1 to M, which has a height Zh from X-Y plane. The height Zh is represented as follows:

$$Zh = R((M-2h)/(N+M)) \quad (B)$$

The equation (B) is obtained by multiplying the equation (14) by R.

In the equatorial region Es, each position of a dot is shifted by a half of the dot interval in the circumference direction with respect to adjacent circumferences so that a dot on a circumference h is positioned between the dots on the adjacent circumferences h−1, h+1 in the equatorial region Es. Cartesian coordinates (Zs,Ys,Zh) where a dot is placed to depict the surface of the equatorial region Es are obtained as follows:

$$Xs = sqrt(R^2 - Zh^2) \cos((s\pi/3N) + (h\pi/6N)) \quad (17)$$

$$Ys = sqrt(R^2 - Zh^2) \sin((s\pi/3N) + (h\pi/6N)) \quad (18)$$

Where, $s = 0, 1, 2, \ldots, 6N-1$

Thus, in order to depict the spherical surfaces of the equatorial region Es, each dot is placed at Cartesian coordinates (Xs,Ys,Zh) where h is an integer from 1 to M, s is an integer from 0 to 6N−1, and Xs, Ys, and Zh are represented by the equations (17), (18), and (B), respectively.

A program listing of a program written in C language to generate dots for depicting a sphere by using a plurality of dots according to the embodiment of the invention is shown in FIG. 14.

Arrangement of a plurality of dots on circumferences of the sphere 5 in Steps 1 and 3 can also be executed as shown below. Assuming the X and Y coordinates of dots as Xt and Yt in order to arrange P dots at an equal interval on a circumference i of the sphere 5 at a height of Zi, Xt and Yt coordinates on which a dot is placed are obtained as follows:

$$c = \cos(2\pi/P), s = \sin(2\pi/P)$$

$$(XO, YO) = (sqrt(R^2 - Zi^2), 0)$$

$$(Xt+1, Yt+1) = (cXt - sYt, sXt + cYt)$$

Where, $t = 0, 1, 2, \ldots, P-1$

Figure 3:
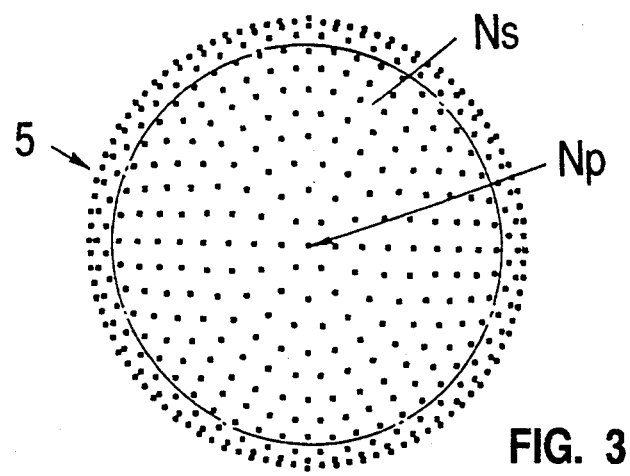
FIG. 3 shows a sphere viewed from its north pole, which is rendered by using a plurality of dots according to the preferred embodiment of the present invention.
Figure 4:
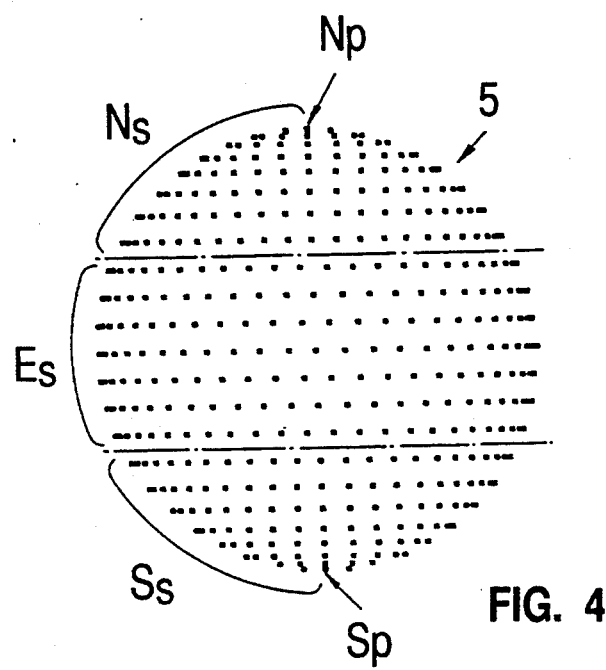
FIG. 4 shows the sphere shown in FIG. 3 and viewed from the equatorial surface at the sphere.
Figure 5:
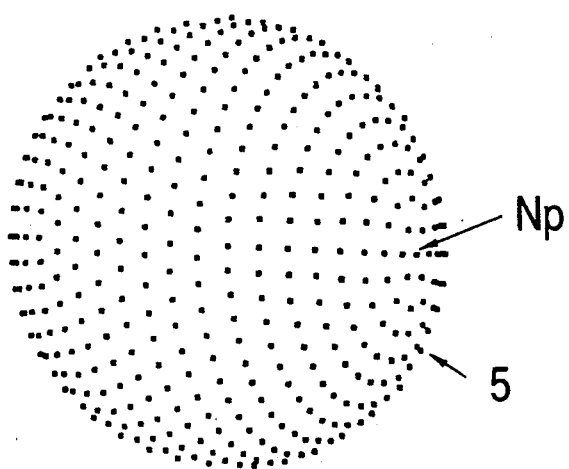
FIG. 5 shows the sphere shown in FIG. 3 after revolution.
Figure 6:
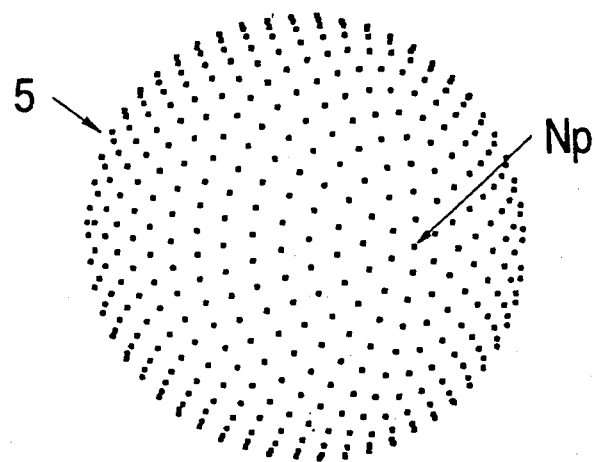
FIG. 6 shows the sphere shown in FIG. 3 after another revolution.

FIGS. 3 and 4 show the representation of a sphere 5 by using a plurality dots according to Steps 1, 2, and 3 of the method of this embodiment shown in FIG. 2. FIGS. 5 and 6 show revolution of the sphere 5 rendered by using the method according to this embodiment shown in FIG. 2. The direction of the sphere 5 after the revolution can easily be obtained because dots are uniformly distributed on the spherical surfaces of the sphere 5 and there is a dot at each pole Np and Sp which is surrounded by dots positioned at coaxial circumferences of the sphere 5.

Figure 7:
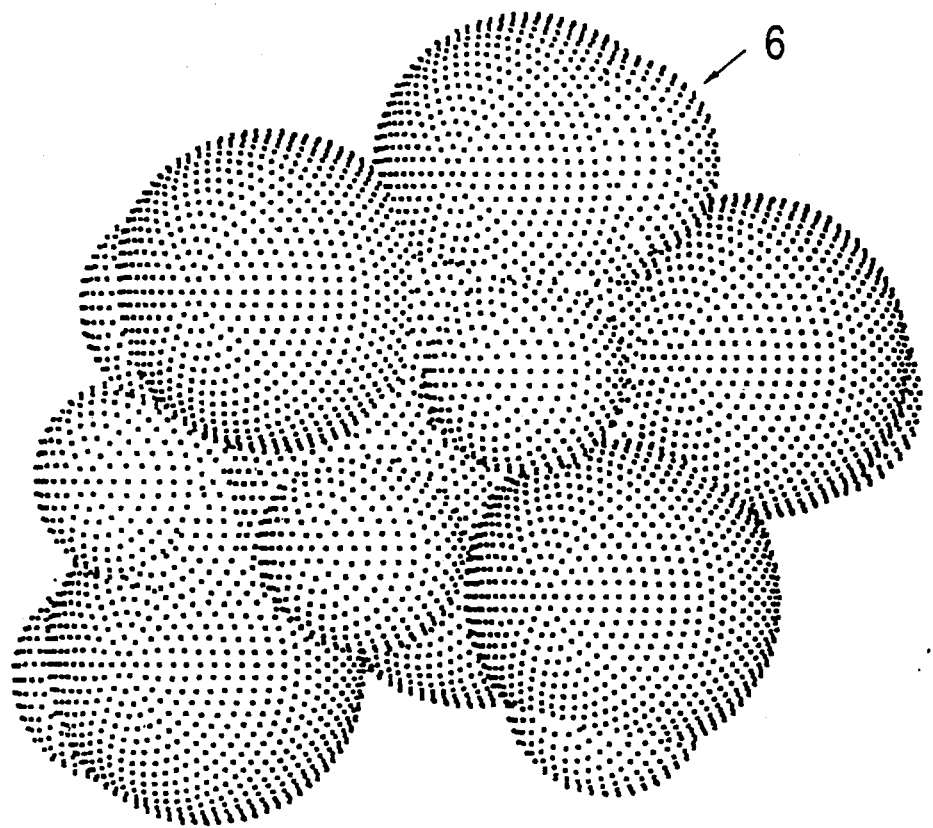
FIG. 7 shows a molecular model formed by combining a plurality of spheres rendered by using a plurality of dots according to the embodiment of the present invention.

FIG. 7 shows a molecular model 6 rendered by combining a plurality of spheres depicted by using the method according the embodiment as shown in FIG. 2.

For the sphere described in the embodiment as shown in FIG. 2, it is preferable to choose the of border between the polar region Ns or Ss and the equatorial region Es at a height of a half of the radius R, from X-Y plane. Therefore, in the above-mentioned embodiment, the polar and equatorial regions are divided at the distance of ½ the radius R from the equatorial surface, that is, X-Y plane. This means that N and M are chosen to be the same value, N=M, at the above equations (A) and (B). Though the height of the coaxial circumferences j and h on which dots are arranged is selected as Zj and Zh, the coaxial circumferences can also be selected so that they are an equally-spaced latitude of a sphere. Though the above embodiment describes spherical surfaces, it is also possible to apply the present invention to render an oval spheroid, hemisphere, hemispheroid, or a combination of them and an other object by using a plurality of dots.

Figure 8:
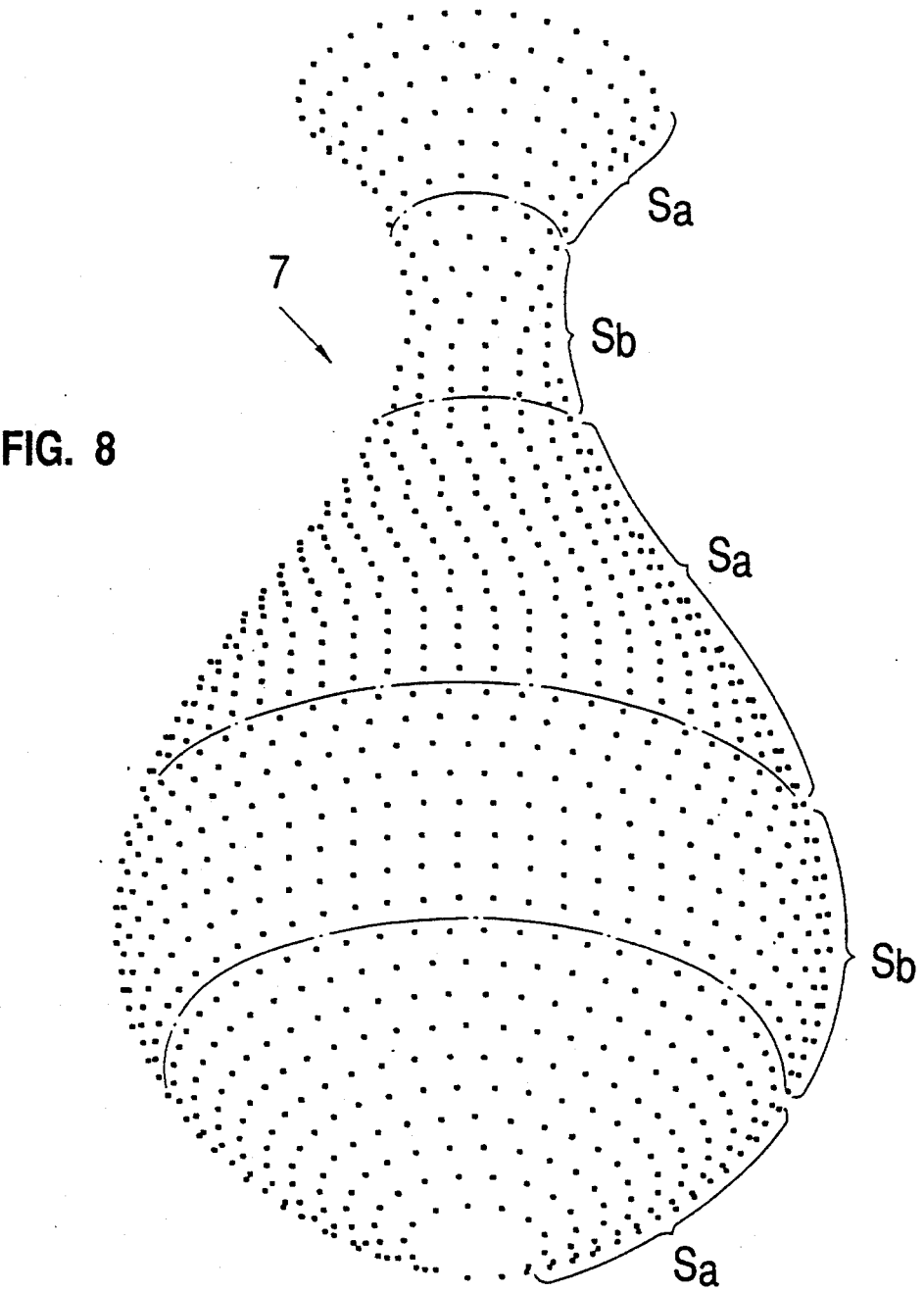
FIG. 8 shows a method of dividing the surfaces forming a three-dimensional object into a plurality of regions and rendering the body by using a plurality of dots according to an embodiment of the present invention.
Figure 9:
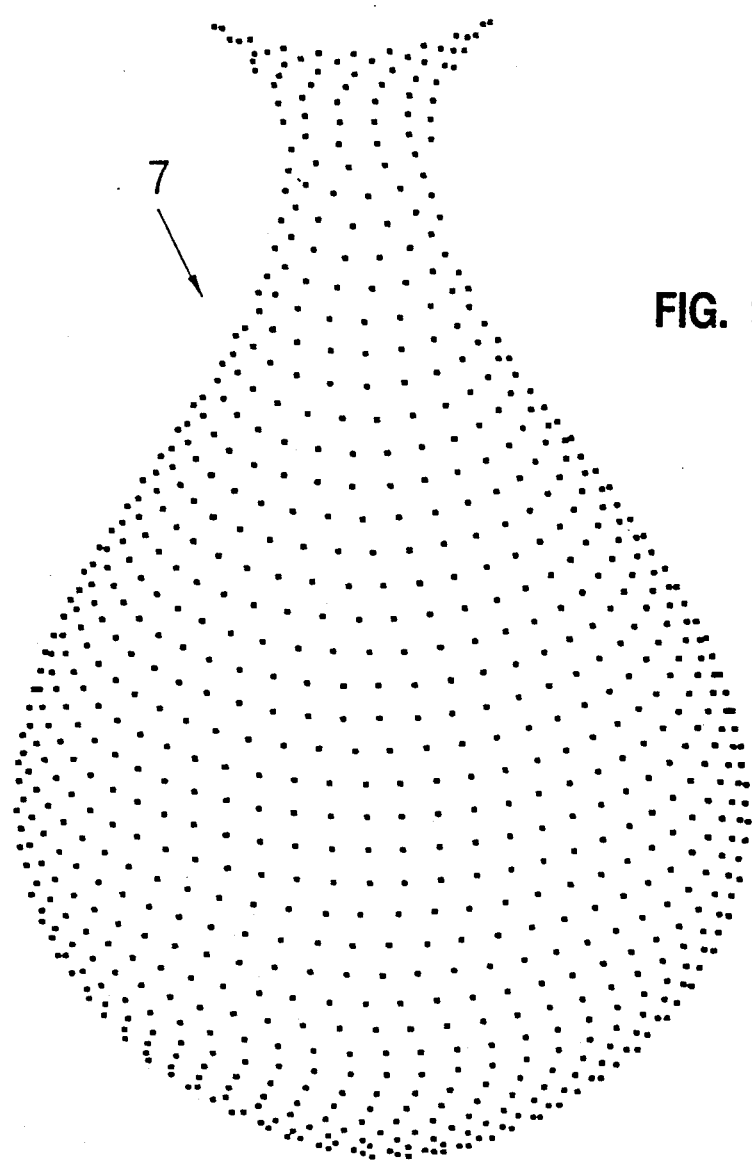
FIG. 9 shows the object shown in FIG. 8 after its revolution.
Figure 10:
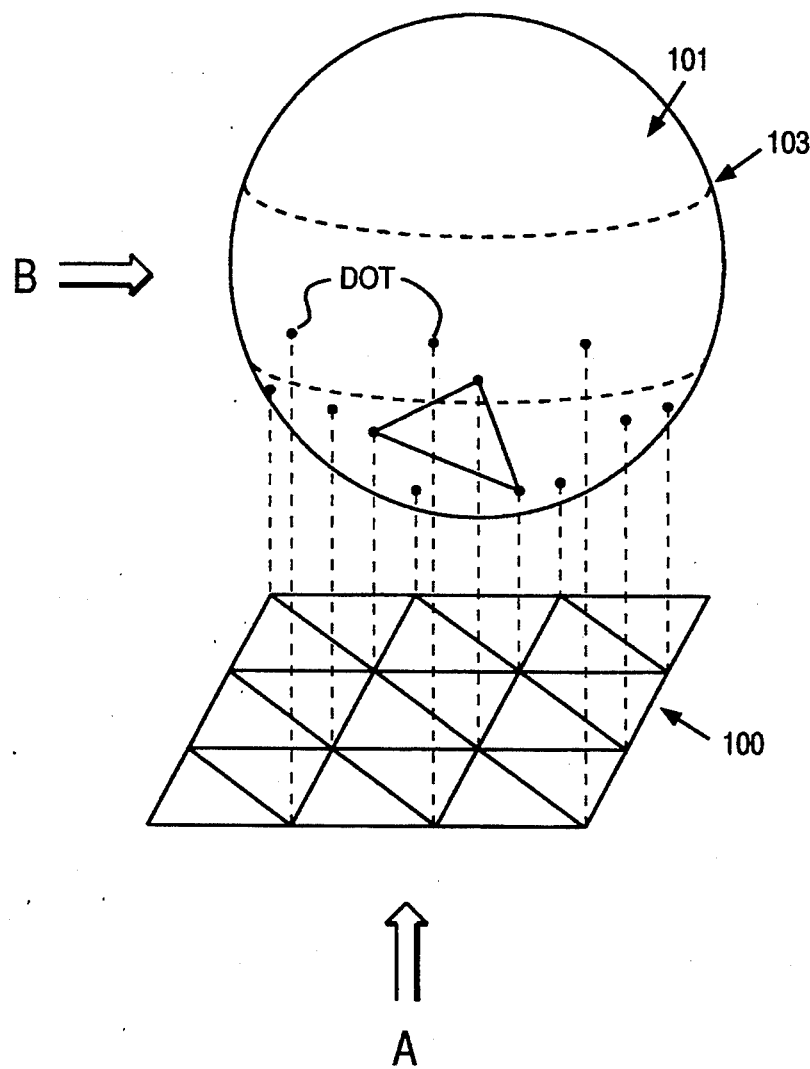
FIG. 10 shows a prior art flat-to-spherical-surface equal-area mapping method for rendering a sphere by using a plurality of dots.
Figure 11:
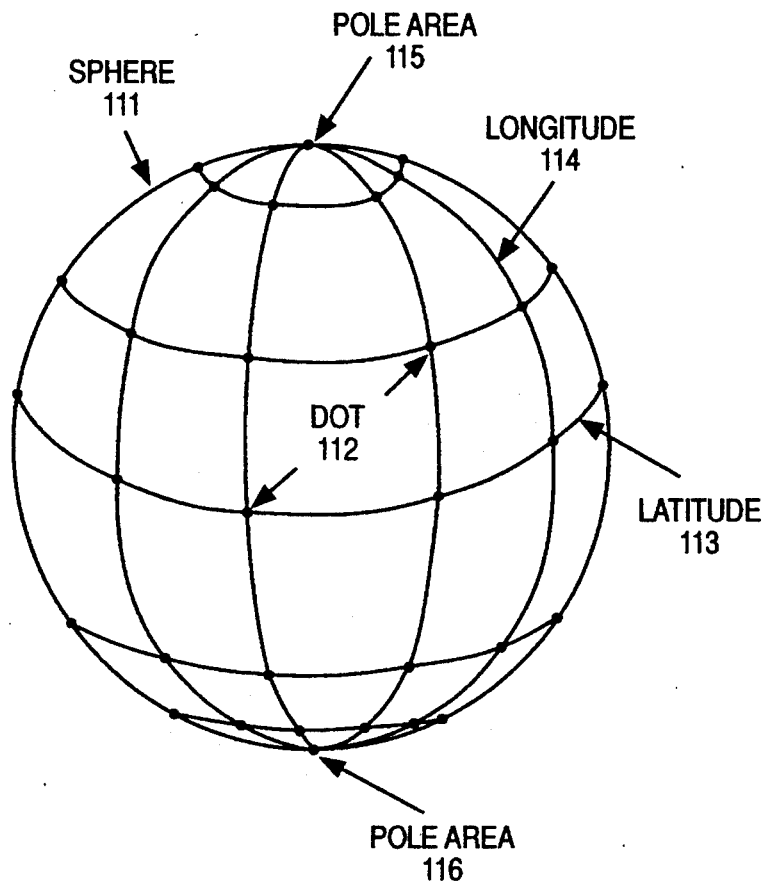
FIG. 11 shows a prior art latitude-longitude inter-section method for rendering a sphere by using a plurality of dots.
Figure 12:
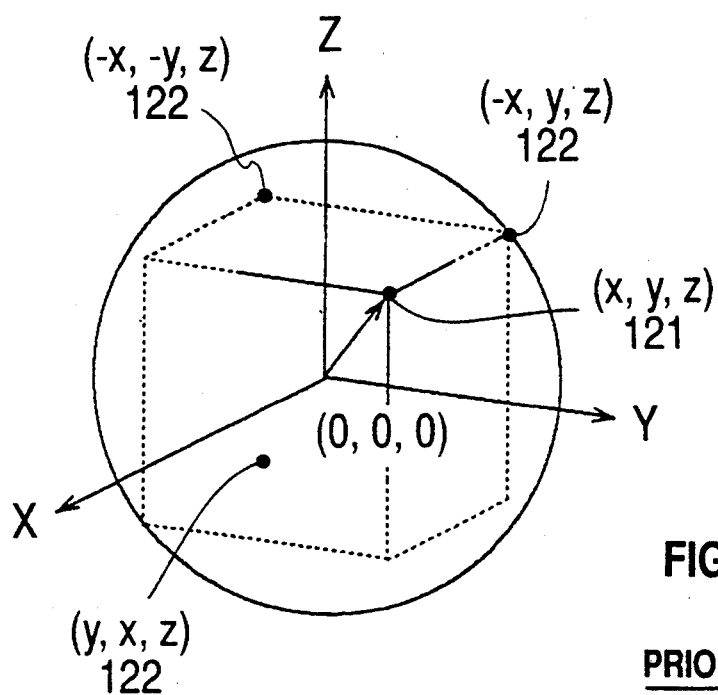
FIG. 12 shows a prior art point symmetry group method for rendering a sphere by using a plurality of dots.
Figure 13:
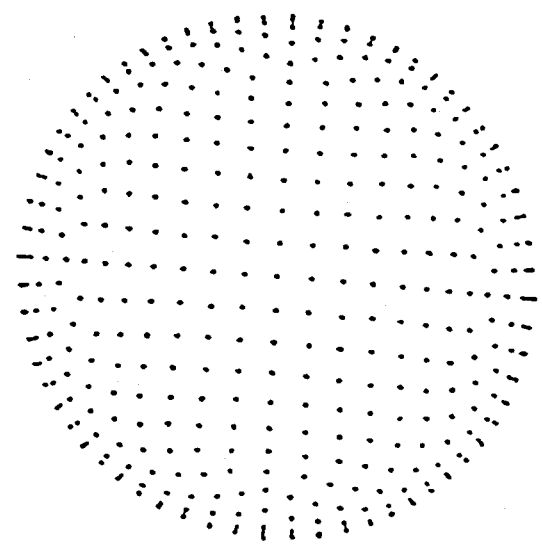
FIG. 13 shows a sphere depicted by using a plurality of dots according to the prior art method of FIG. 12.

FIGS. 8 and 9 show another embodiment of the present invention for three-dimensionally rendering a vase 7 by using a plurality of dots. As shown in FIGS. 8 and 9, the surfaces forming the vase 7 are divided into regions Sa having a relatively large change in curvature around the revolutionary axis of the vase 7 and regions Sb having a relatively small change in curvature around the revolutionary axis of the vase 7. The dots whose number increases (e.g. in an arithmetic progression) in accordance with the increase of the curvature around the revolutionary axis of the vase 7 are arranged at an equal interval on coaxial circumferences on the surfaces of the vase 7 in the regions Sa and a certain number of dots are arranged at an equal interval on coaxial circumferences on the surfaces of the vase 7 in the regions Sb so that a dot on a coaxial circumference is located between the dots on the adjacent coaxial circumferences in the regions Sb. As shown in FIGS. 8 and 9, the direction of the vase 7 can easily be obtained in each drawing after the vase 7 is rotated because dots are uniformly distributed on circumferences of the surfaces forming the vase 7.

According to the present invention, dots are approximately uniformly distributed on the surfaces of a three-dimensional object. Therefore, stripes are not produced on the surfaces even if a three-dimensional model is rotated continuously, that is, in real time, unlike the conventional equal-area mapping. Furthermore, dots are not concentrated on the polar regions nor scarce at the equatorial region as in the latitude-longitude intersection method. Moreover, because calculation of dot distribution is easy and simple the positions of dots for rotation of coordinates can easily be calculated and the amount of computer throughput is not required to the same degree as it is in the point symmetry group method. The relationship between the direction of the rotated or revolved three-dimensional model and the vision direction of the user can easily be obtained, and dots are not unnaturally arranged on the surfaces after rotation or revolution of the object.

Although the present invention has been fully described above with reference to specific embodiments, other alternate embodiments may be apparent to those of ordinary skill in the art. Therefore, the above description should not be taken as limiting the scope of the present invention as defined by the appended claims.

What is claimed is:

1. A method of rendering on a display means a three dimensional body of revolution having a surface and an axis of revolution comprising the steps of:
   a) selecting a portion of the surface of said three dimensional body of revolution as a first region and another portion of the surface as a second region;
   b) arranging a location of a first plurality of dots on said first region based on a change in a radius of revolution of the surface of the first region about the axis of revolution;
   c) arranging a location of a second plurality of dots on said second region not based on a change in the radius of revolution of the surface of the second region about the axis of revolution; and
   d) rendering a selected portion of said first and second plurality of dots on said display means.

2. The method of claim 1 wherein said step of selecting includes selecting said regions based on a change in a radius of revolution of the surface from the revolution axis.

3. The method of claim 2 wherein said step of selecting includes selecting noncontiguous portions of the surface for at least one of said first and second regions.

4. The method of claim 2 wherein said step of selecting includes selecting said first and second regions based on a change in the radius of revolution, said first region having a larger change in the radius of revolution than said second region.

5. The method of claim 4 wherein said step of arranging a location of a first plurality of dots includes arranging an increasing number of dots in circles at approximately equal intervals about said revolution axis, said number of dots increasing with an increase in the radius of revolution.

6. the method of claim 5 wherein said step of arranging a location of a second plurality of dots includes arranging a equal number of dots in circles at approximately equal intervals about said revolution axis.

7. An apparatus for rendering a three dimensional body of revolution having a surface and an axis of revolution comprising:
   a) means for selecting a portion of the surface of said three dimensional body of revolution as a first region and another portion of the surface as a second region;
   b) means for arranging a location of a first plurality of dots on said first region based on a change in a radius of revolution of the surface of the first region about the axis of revolution; and
   c) means for arranging a location of a second plurality of dots on said second region not based on a change in a radius of revolution of the surface of the second region about the axis of revolution.

8. The apparatus of claim 7 wherein said means for selecting includes means for selecting said regions based on a change in a radius of revolution of the surface from the revolution axis.

9. The apparatus of claim 8 wherein said means for selecting includes means for selecting noncontiguous portions of the surface for at least one of said first and second regions.

10. The apparatus of claim 8 wherein said means for selecting includes means for selecting said first and second regions based on a change in the radius of revolution, said first region having a larger change in the radius of revolution than said second region.

11. The apparatus of claim 10 wherein said means for arranging a location of a first plurality of dots includes means for arranging an increasing number of dots in circles at approximately equal intervals about said revolution axis, said number of dots increasing with an increase in the radius of revolution.

12. The apparatus of claim 11 wherein said means for arranging a location of a second plurality of dots includes means for arranging a equal number of dots in circles at approximately equal intervals about said revolution axis.

13. A computer system for rendering a three dimensional body of revolution having a surface and an axis of revolution comprising:
   a) a processor for processing data;
   b) a memory coupled to said processor for storing data to be processed;
   c) means coupled to said processing means for selecting a portion of the surface of said body of revolution as a first region and another portion of the surface as a second region;
   d) means coupled to said processing means for arranging a location of a first plurality of dots on said first region based on a change in the radius of revolution of the surface of the first region about the axis of revolution; and
   e) means coupled to said processing means for arranging a location of a second plurality of dots on said second region not based on a change in the radius of revolution of the surface of the second region about the axis of revolution.

14. The computer system of claim 13 wherein said means for selecting includes means for selecting said regions based on a change in a radius of revolution of the surface from the revolution axis.

15. The computer system of claim 14 wherein said means for selecting includes means for selecting non-contiguous portions of the surface for at least one of said first and second regions.

16. The computer system of claim 14 wherein said means for selecting includes means for selecting said first and second regions based on a change in the radius of revolution, said first region having a larger change in the radius of revolution than said second region.

17. The computer system of claim 16 wherein said means for arranging a location of a first plurality of dots includes means for arranging an increasing number of dots in circles at approximately equal intervals about said revolution axis, said number of dots increasing with an increase in the radius of revolution.

18. The computer system of claim 17 wherein said means for arranging a location of a second plurality of dots includes means for arranging a equal number of dots in circles at approximately equal intervals about said revolution axis.

* * * * *